(12) United States Patent
Fagioli (10) Patent No.: US 11,534,013 B2
(45) Date of Patent: Dec. 27, 2022

(54) PIZZA CUTTER CLEANING, STORAGE, AND ISOLATION DEVICE

(71) Applicant: Danny Fagioli, Mississauga (CA)

(72) Inventor: Danny Fagioli, Mississauga (CA)

(*) Notice: Subject to any disclaimer, the term of this patent is extended or adjusted under 35 U.S.C. 154(b) by 177 days.

(21) Appl. No.: 17/080,235

(22) Filed: Oct. 26, 2020

(65) Prior Publication Data

US 2022/0125228 A1    Apr. 28, 2022

(51) Int. Cl.
| | |
|---|---|
| *A47G 21/14* | (2006.01) |
| *B24B 3/46* | (2006.01) |
| *B26B 25/00* | (2006.01) |
| *A21C 15/04* | (2006.01) |
| *A47L 21/00* | (2006.01) |

(52) U.S. Cl.
CPC .............. *A47G 21/14* (2013.01); *A21C 15/04* (2013.01); *B24B 3/46* (2013.01); *B26B 25/005* (2013.01); *A47L 21/00* (2013.01)

(58) Field of Classification Search
CPC .......... A47L 15/00; A47L 15/42; A47L 21/00; A61L 2/10; B24D 15/084; B08B 1/00; B08B 1/002; B08B 1/006; B08B 1/007; A61B 90/70; A47G 21/14; A47J 47/16; A47B 77/14; A47B 77/18; A47B 47/16; B26B 25/005; B24B 3/46; A41C 15/04
USPC ........... 15/218.1, 104.92; 200/735; 30/298.4, 30/138; 248/37.3; 211/70.7; D7/637
See application file for complete search history.

(56) References Cited

U.S. PATENT DOCUMENTS

| 155,636 | A | * | 10/1874 | Byrns | ..................... | A47L 21/00 |
| | | | | | | 451/493 |
| 177,394 | A | * | 5/1876 | Hall et al. | ............... | A47L 21/00 |
| | | | | | | 15/218.1 |
| 651,644 | A | * | 6/1900 | Abbott | ..................... | A47L 21/00 |
| | | | | | | 15/218.1 |
| 1,144,456 | A | * | 6/1915 | Barnes | ..................... | A47L 21/00 |
| | | | | | | 15/218.1 |
| 1,219,993 | A | * | 3/1917 | Omoto | ..................... | A47L 21/00 |
| | | | | | | 15/210.1 |
| 1,598,443 | A | * | 8/1926 | Horan | ..................... | A47G 21/14 |
| | | | | | | 206/207 |
| 1,682,571 | A | * | 8/1928 | Horan | ..................... | A47G 21/14 |
| | | | | | | 224/233 |

(Continued)

FOREIGN PATENT DOCUMENTS

DE             20017016     *  1/2001   .............. A47J 47/16

*Primary Examiner* — Laura M Lee
(74) *Attorney, Agent, or Firm* — Pharar Patents & Intellectual Property; Andrew A. Pharar (57) ABSTRACT

The pizza cutter cleaning, storage, and isolation device may allow a user to store and clean pizza cutters between uses, while also isolating each pizza cutter intended for specific consumers. Such a device may implement a cartridge system, one or more of which may be installed in a main body, into which a single pizza cutter may be placed. The cartridge may be designed to isolate and clean the pizza cutter installed therein, and the pizza cutters themselves may be color-coded, or the cartridges may be color-coded, so as to prevent cross-contamination of the cutters, the pizzas, or the debris picked up when cutting a pizza. The cartridges may further implement a sanitizing bath into which a pizza cutter head may be suspended, or may implement a catch tank for waste debris. The device may further comprise a blade sharpener for additional functionality.

6 Claims, 7 Drawing Sheets

(56) References Cited

U.S. PATENT DOCUMENTS

| | | | | |
|---|---|---|---|---|
| 2,121,307 A * | 6/1938 | Swift | | 15/210.1 |
| 2,441,690 A * | 5/1948 | Dirksen | | B24D 15/084 451/461 |
| 2,648,858 A * | 8/1953 | Paull | | A47L 21/00 15/118 |
| 2,826,879 A * | 3/1958 | Evans | | B24D 15/084 76/86 |
| 3,428,988 A * | 2/1969 | Blackburn | | A46B 15/00 15/160 |
| 4,087,878 A * | 5/1978 | Grieshaber | | A61B 90/70 15/160 |
| 4,439,884 A * | 4/1984 | Giorni | | B08B 1/00 15/160 |
| 4,537,315 A * | 8/1985 | Griffin | | A47G 21/14 248/37.3 |
| 4,704,760 A * | 11/1987 | Grieshaber | | A61B 90/70 15/218.1 |
| 4,718,200 A * | 1/1988 | Miquelot | | A61D 19/04 76/82 |
| 4,794,738 A * | 1/1989 | Brignoli | | B24D 15/084 76/82 |
| 4,872,235 A * | 10/1989 | Nielsen | | A61B 90/70 15/104.92 |
| 4,970,006 A * | 11/1990 | Martinez | | A47G 21/14 248/37.3 |
| 5,494,176 A * | 2/1996 | Zallo | | B24D 15/084 D7/638 |
| 5,652,993 A * | 8/1997 | Kreyer | | A46B 11/00 15/160 |
| 6,082,559 A * | 7/2000 | Levsen | | B65D 25/10 248/37.3 |
| 6,371,312 B1 * | 4/2002 | Tsuchida | | A47G 21/14 248/37.3 |
| 6,854,186 B2 * | 2/2005 | Basden | | A47G 21/14 248/37.3 |
| D532,658 S * | 11/2006 | Shen | | D7/637 |
| 7,210,588 B1 * | 5/2007 | Ayon | | G09F 3/00 211/70.7 |
| 8,590,427 B2 * | 11/2013 | Murphy | | B24D 15/084 206/349 |
| 8,696,075 B1 * | 4/2014 | Rios | | A47F 10/06 312/249.12 |
| 9,295,370 B1 * | 3/2016 | Barlow | | A46B 3/18 |
| 10,383,468 B2 * | 8/2019 | Kerulis | | A47G 21/14 |
| 10,980,366 B1 * | 4/2021 | Wong | | A47G 21/14 |
| 2005/0273957 A1 * | 12/2005 | Boltryk | | A46B 9/00 15/160 |
| 2006/0049123 A1 * | 3/2006 | Berti | | A47G 21/14 211/70.7 |
| 2009/0255133 A1 * | 10/2009 | Bonapace | | A47G 21/14 248/37.3 |
| 2011/0084177 A1 * | 4/2011 | Curwen | | A47G 21/14 248/37.3 |
| 2012/0266468 A1 * | 10/2012 | Murphy | | B24D 15/084 30/298.4 |
| 2012/0324740 A1 * | 12/2012 | Brough | | A47G 21/14 30/298.4 |
| 2015/0246378 A1 * | 9/2015 | Clark | | A47L 15/0015 134/1 |
| 2016/0302641 A1 * | 10/2016 | Ivy | | A47L 17/00 |
| 2021/0276049 A1 * | 9/2021 | Perez | | B08B 1/002 |
| 2022/0125228 A1 * | 4/2022 | Fagioli | | B26B 25/005 |

\* cited by examiner

PIZZA CUTTER CLEANING, STORAGE, AND ISOLATION DEVICE

TECHNICAL FIELD OF THE INVENTION

The present invention relates in general to utensil storage devices, and, more specifically, to a pizza cutter cleaning, storage, and isolation device.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Pizza is a well-known savory Italian dish made and sold all over the world and in a number of different styles and variations. The primary ingredients of a pizza include a flattened base covered with sauces and toppings, and then heated for cooking. Classic pizzas may include a round base of leavened dough often topped with a tomato sauce, cheese, and those ingredients desired by the consumer. Variations of pizza may include the use of a square, or other shape, base, the use of pesto or other sauces in lieu of tomato sauce, the use of a thicker dough to provide a deeper base and sides, the impregnation of cheeses or other ingredients into the dough, and the use of non-wheat ingredients, such as cauliflower, instead of dough.

Due to their size, a pizza is generally consumed by first cutting it into multiple slices. In the case of a round pizza such slices may be triangular in shape, though a square pizza, or even a round pizza cut in a non-standard fashion, may produce slices that are square or otherwise alternatively shaped. In formal settings, especially in Italy, such slices are then consumed with the implementation of a fork and knife. In less formal settings, or generally in other locales around the world, pizza slices may be consumed while held in the hand.

The cutting of pizza into slices is most easily done with a pizza cutter, which may be a circular blade attached to a handgrip, and which may be run across the diameter, or length, of a pizza for continuous cutting. A pizza could also be cut with a knife, though a knife usually cannot cut across the entire surface of a pizza in one maneuver, and requires extra effort, multiple cuts, and additional time to accomplish the same result.

Due to the ubiquitous nature of pizza, it is often consumed by persons of widely varied tastes, limitations, and ideologies. As with all food that may be adapted to such wide preferences, pizza may be made available, for example, with a wheat-based dough covered in chicken, beef, and pork, or with a cauliflower dough covered in a rainbow of fruits and vegetables. A problem arises, though, when a single pizza maker is tasked with making pizzas desirable to both the non-vegetarian lifestyle and the strictly vegetarian, or vegan or gluten-sensitive, consumer. The problem, very specifically, is the use of the pizza cutter.

A pizza maker may own and implement multiple pizza cutters for efficiency and redundancy, but the use of a single pizza cutter both on a meat lover's pizza and a vegetarian or gluten-free pizza may result in cross-contamination of the two pizzas, in addition to insulting the mores of a particular customer. No solution exists to store multiple pizza cutters while also cleaning each pizza cutter between uses so as to prevent cross-contamination between pizzas. An effective solution may further provide a color-coded solution for cutting pizzas destined for consumers of particular preferences.

Thus, there is a need in the art for a pizza cutter cleaning, storage, and isolation device that may allow a user to store and clean pizza cutters between uses, while also isolating each pizza cutter intended for specific consumers. Such a device may implement a cartridge system, one or more of which may be installed in a main body, into which a single pizza cutter may be placed. The cartridge may be designed to isolate and clean the pizza cutter installed therein, and the pizza cutters themselves may be color-coded, or the cartridges may be color-coded, so as to prevent cross-contamination of the cutters, the pizzas, or the debris picked up when cutting a pizza. It is to these ends that the present invention has been developed.

BRIEF SUMMARY OF THE INVENTION

To minimize the limitations in the prior art, and to minimize other limitations that will be apparent upon reading and understanding the present specification, the present invention describes a pizza cutter cleaning, storage, and isolation device.

It is an objective of the present invention to provide a pizza cutter cleaning, storage, and isolation device that may comprise a main body.

It is another objective of the present invention to provide a pizza cutter cleaning, storage, and isolation device that may comprise a plurality of storage cartridges.

It is another objective of the present invention to provide a pizza cutter cleaning, storage, and isolation device that may comprise a plurality of storage cartridge receivers.

It is another objective of the present invention to provide a pizza cutter cleaning, storage, and isolation device that may comprise a plurality of pizza cutters.

It is another objective of the present invention to provide a pizza cutter cleaning, storage, and isolation device that may comprise a plurality of cleaning wipers.

It is another objective of the present invention to provide a pizza cutter cleaning, storage, and isolation device that may comprise a cleaning mechanism.

It is another objective of the present invention to provide a pizza cutter cleaning, storage, and isolation device that may comprise a locking mechanism.

It is another objective of the present invention to provide a pizza cutter cleaning, storage, and isolation device that may comprise a blade sharpener.

It is another objective of the present invention to provide a pizza cutter cleaning, storage, and isolation device that may comprise an insulating seal.

It is another objective of the present invention to provide a pizza cutter cleaning, storage, and isolation device that may comprise a resilient material of construction.

It is another objective of the present invention to provide a pizza cutter cleaning, storage, and isolation device that may comprise a water-proof material of construction.

It is another objective of the present invention to provide a pizza cutter cleaning, storage, and isolation device that may comprise a reusable material of construction.

It is another objective of the present invention to provide a pizza cutter cleaning, storage, and isolation device that may comprise a multi-component construction.

It is another objective of the present invention to provide a pizza cutter cleaning, storage, and isolation device that may comprise an antimicrobial layer.

It is another objective of the present invention to provide a pizza cutter cleaning, storage, and isolation device that may comprise an antimicrobial material of construction.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

The pizza cutter cleaning, storage, and isolation device disclosed herein may allow a user to store and clean pizza cutters between uses, while also isolating each pizza cutter intended for specific consumers. Such a device may implement a cartridge system, one or more of which may be installed in a main body, into which a single pizza cutter may be placed. The cartridge may be designed to isolate and clean the pizza cutter installed therein, and the pizza cutters themselves may be color-coded, or the cartridges may be color-coded, so as to prevent cross-contamination of the cutters, the pizzas, or the debris picked up when cutting a pizza. The cartridges may further implement a sanitizing bath into which a pizza cutter circular blade may be suspended, or may implement a catch tank for waste debris. The device may further comprise a blade sharpener for additional functionality.

The illustrations of FIGS. 1-5 illustrate an overall view of a pizza cutter cleaning, storage, and isolation device, as contemplated by the present disclosure. The device may comprise, generally, a main body 100 and a plurality of storage cartridges 200 capable of receiving a plurality of pizza cutters 300.

The main body 100 may comprise any shape and design appropriate for its intended purpose. In one embodiment the main body 100 may generally comprise a cube or a rectangular cuboid shape having rounded edges and a plurality of cartridge slots 102. One each of the plurality of cartridge slots 102 may be appropriately sized and shaped to receive and enclose one each of a plurality of storage cartridges 200, which themselves may be appropriately sized and shaped to receive and enclose one each of a plurality of pizza cutters 300. The main body 100 may comprise any number of cartridge slots 102, but generally may comprise between one and six cartridge slots 102.

The main body 100 may further comprise a blade sharpener 104, which may be any appropriate blade sharpener known in the art. In one embodiment, due to the continuous blade nature of pizza cutters 300, the blade sharpener 104 may comprise a continuous trench in a side of the main body 100 along which a pizza cutter 300 may be run to be sharpened. In one embodiment the main body 100 may additionally comprise a standard blade sharpener for sharpening knives, to provide additional functionality to the combination.

Figure 1:
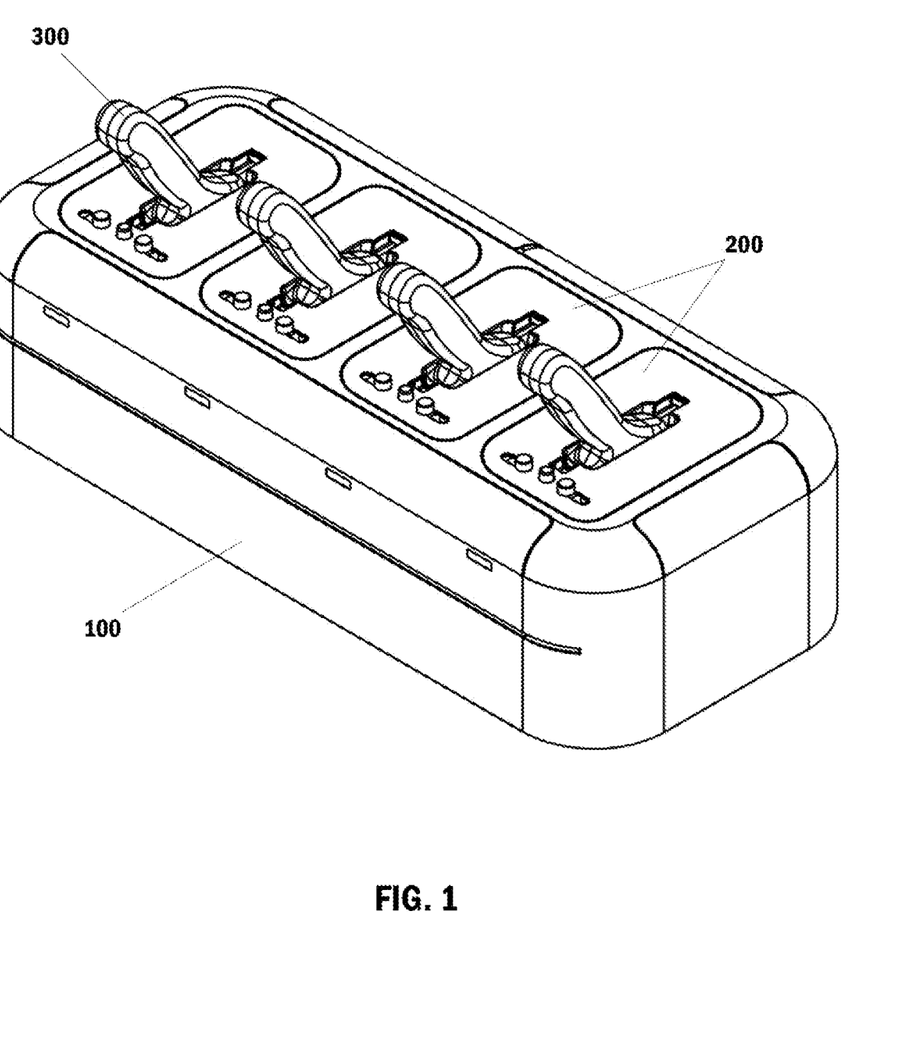
FIG. 1 is an isometric perspective view of a pizza cutter cleaning, storage, and isolation device, as contemplated by the present disclosure.
Figure 2:
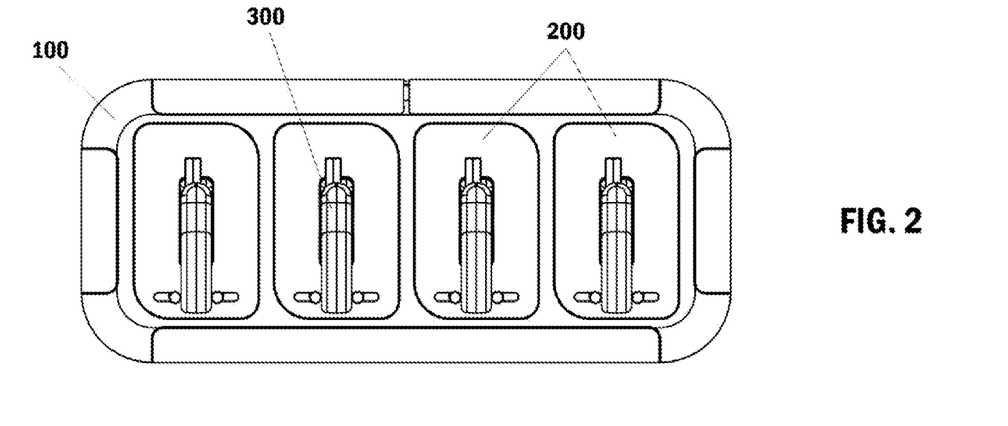
FIG. 2 is a top plan view of a pizza cutter cleaning, storage, and isolation device, as contemplated by the present disclosure.
Figure 3:
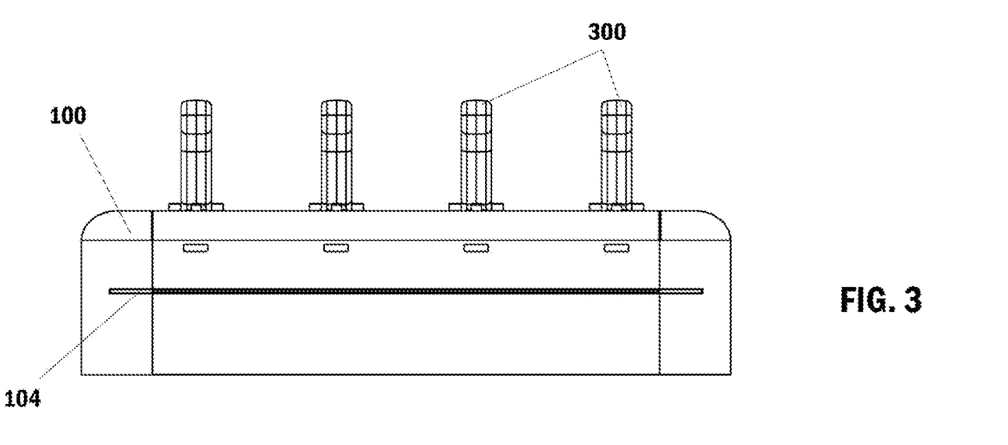
FIG. 3 is a front elevation view of a pizza cutter cleaning, storage, and isolation device, as contemplated by the present disclosure.
Figure 4:
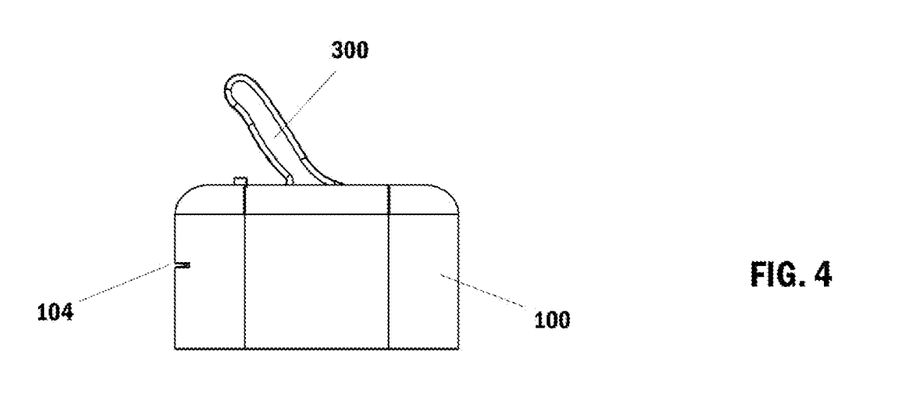
FIG. 4 is side elevation perspective view of a pizza cutter cleaning, storage, and isolation device, as contemplated by the present disclosure.
Figure 5:
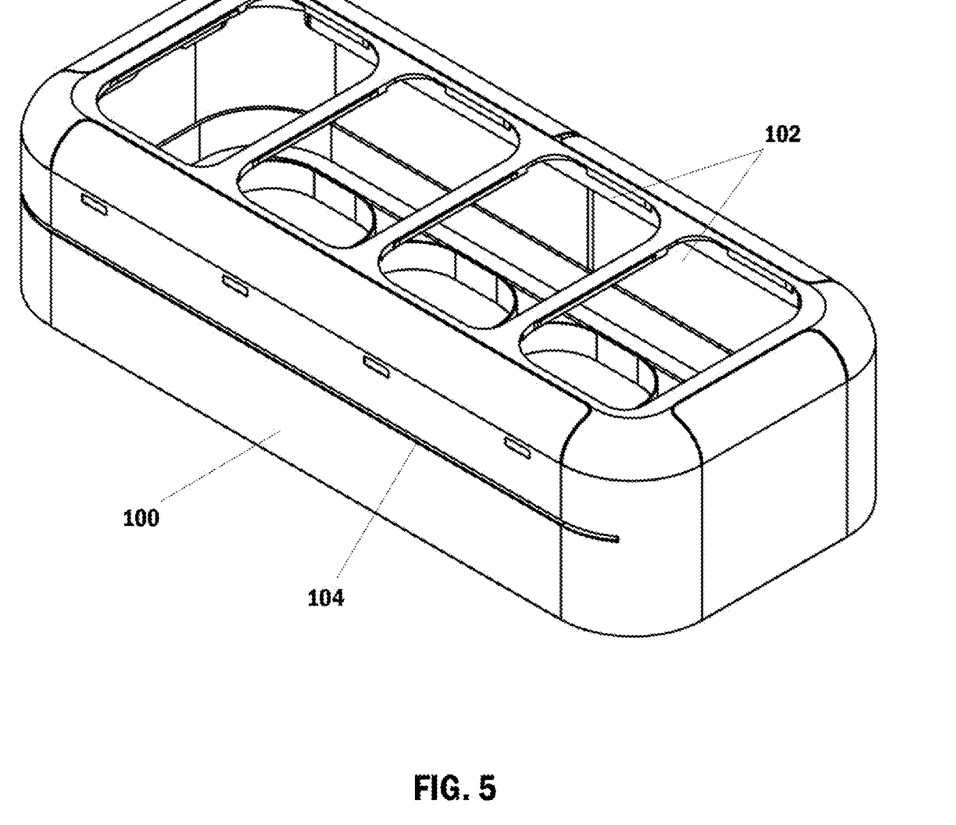
FIG. 5 is an isometric perspective view of a pizza cutter cleaning, storage, and isolation device with storage cartridges removed, as contemplated by the present disclosure.
Figure 6:
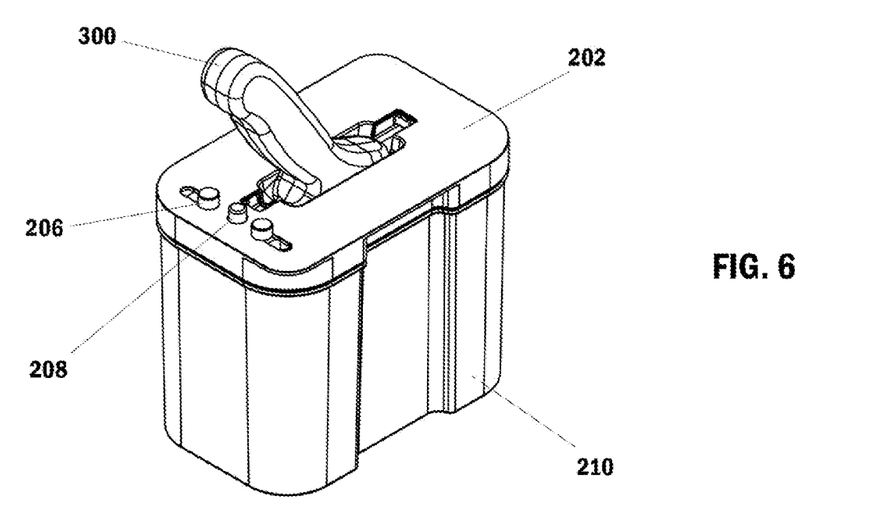
FIG. 6 is an isometric perspective view of a storage cartridge of a pizza cutter cleaning, storage, and isolation device with pizza cutter installed, as contemplated by the present disclosure.
Figure 7:
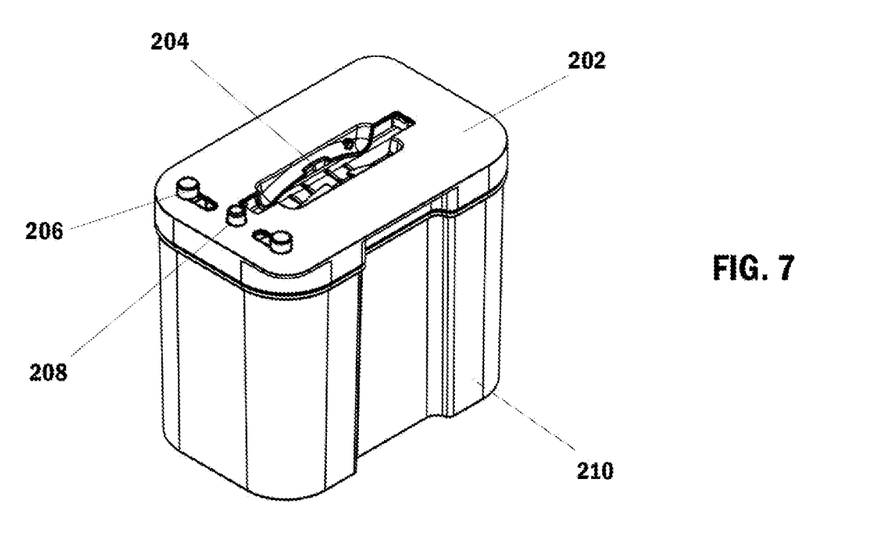
FIG. 7 is an isometric perspective view of a storage cartridge of a pizza cutter cleaning, storage, and isolation device with pizza cutter removed, as contemplated by the present disclosure.
Figure 8:
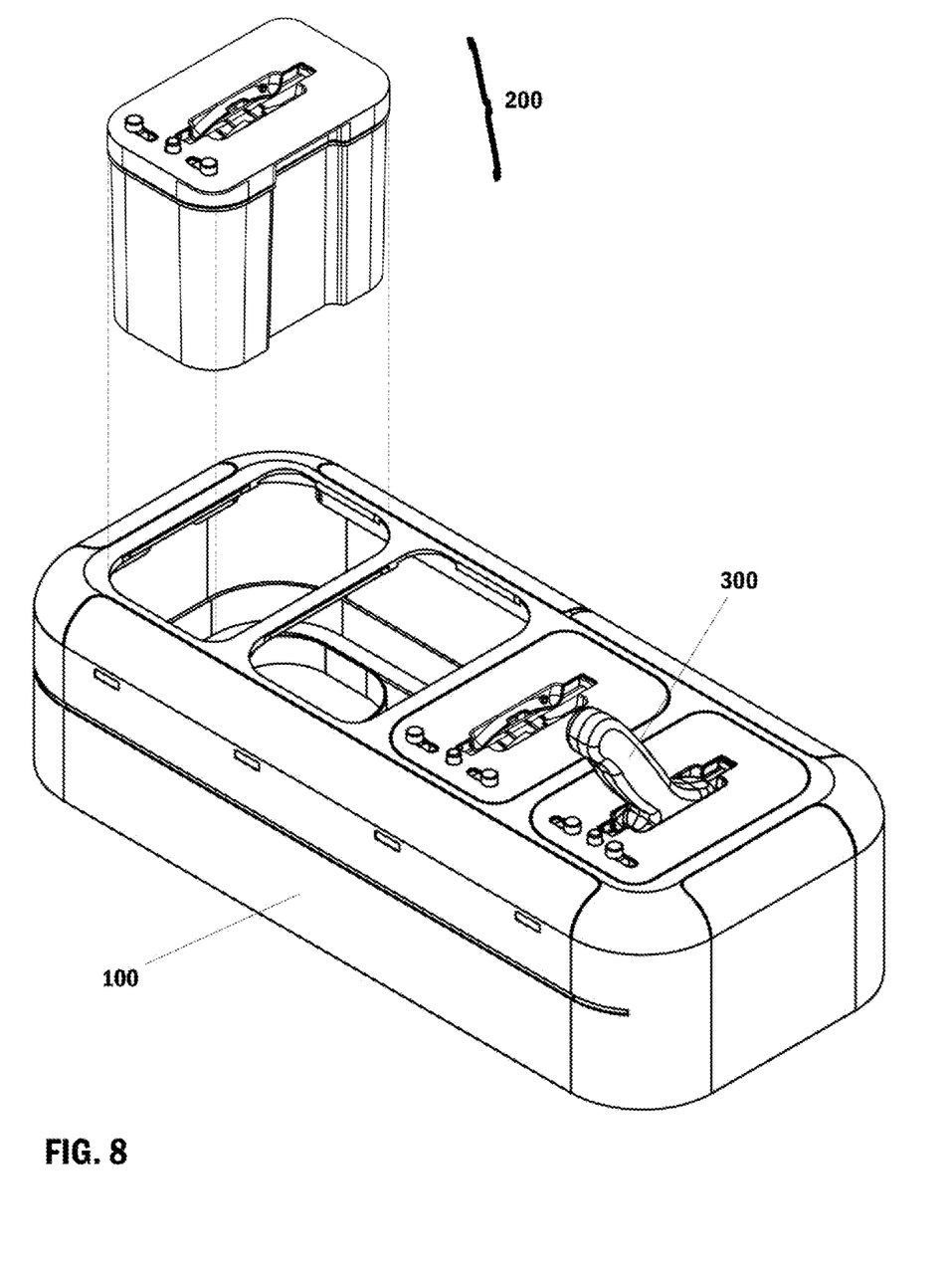
FIG. 8 is an isometric perspective view of the relative placement of a storage cartridge of a pizza cutter cleaning, storage, and isolation device, as contemplated by the present disclosure.
Figure 9:
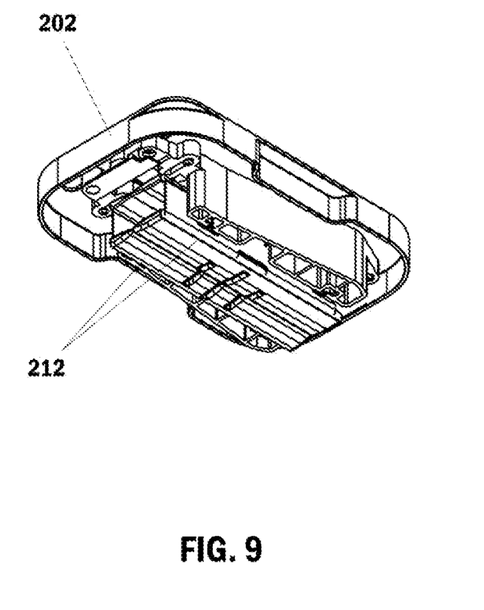
FIG. 9 is a lower isometric perspective view of a cartridge lid of a pizza cutter cleaning, storage, and isolation device with cleaning blades closed, as contemplated by the present disclosure.
Figure 10:
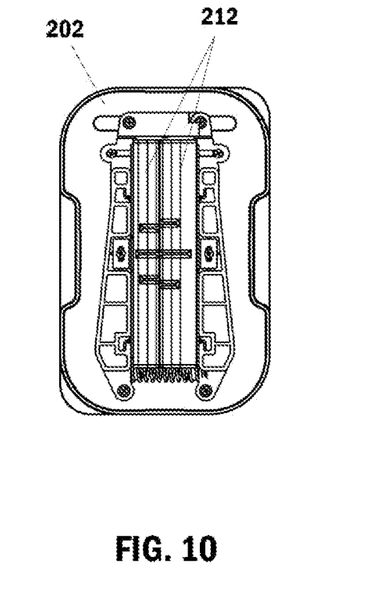
FIG. 10 is a bottom plan view of a cartridge lid of a pizza cutter cleaning, storage, and isolation device with cleaning blades closed, as contemplated by the present disclosure.
Figure 11:
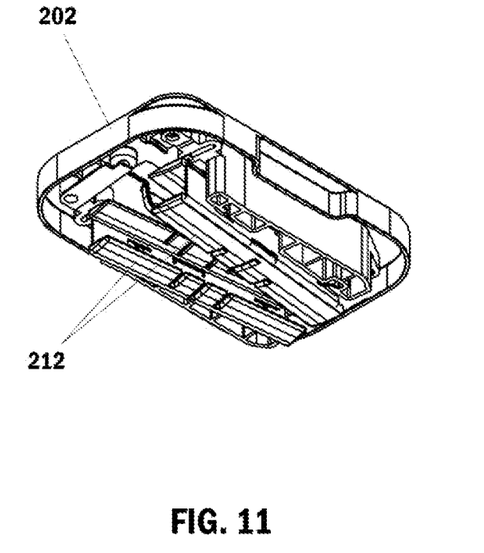
FIG. 11 is a lower isometric perspective view of a cartridge lid of a pizza cutter cleaning, storage, and isolation device with cleaning blades opened, as contemplated by the present disclosure.
Figure 12:
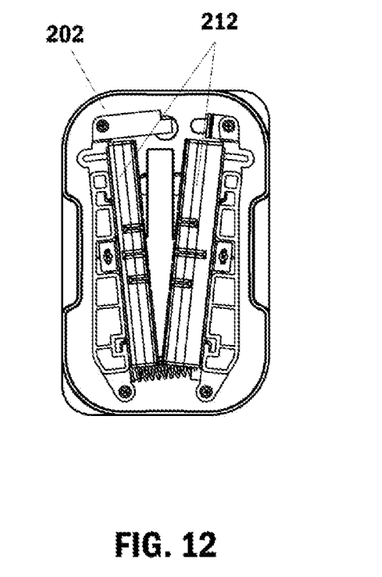
FIG. 12 is a bottom plan view of a cartridge lid of a pizza cutter cleaning, storage, and isolation device with cleaning blades opened, as contemplated by the present disclosure.
Figure 13:
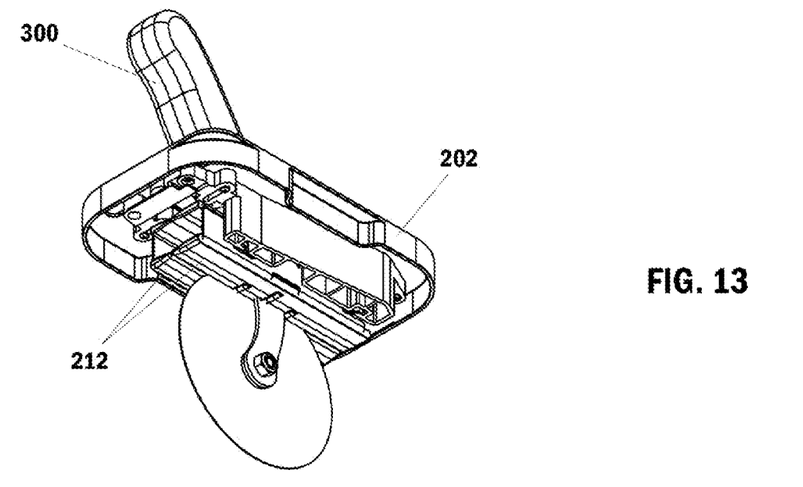
FIG. 13 is a lower isometric perspective view of a cartridge lid of a pizza cutter cleaning, storage, and isolation device with cleaning blades closed and pizza cutter installed, as contemplated by the present disclosure.
Figure 14:
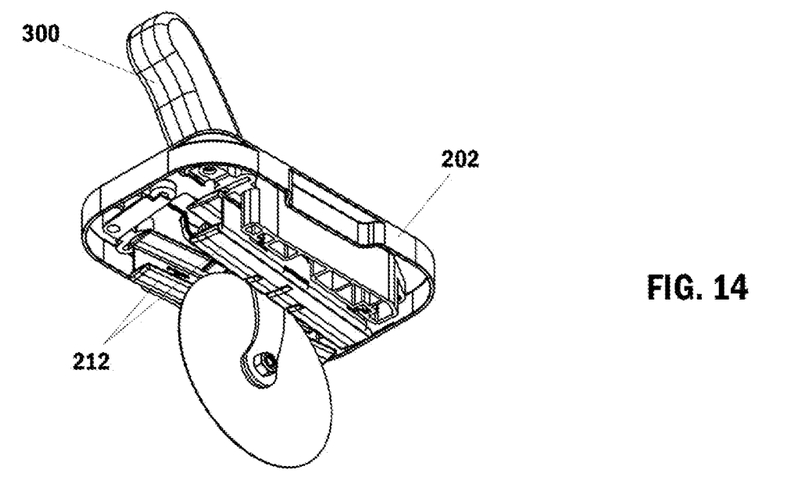
FIG. 14 is a lower isometric perspective view of a cartridge lid of a pizza cutter cleaning, storage, and isolation device with cleaning blades opened and pizza cutter installed, as contemplated by the present disclosure.

The illustrations of FIGS. 6-8 illustrate an overall view of a storage cartridge 200 of a pizza cutter cleaning, storage, and isolation device, as contemplated by the present disclosure. Each storage cartridge 200 may comprise any shape and design appropriate for its intended purpose. In one embodiment the storage cartridge 200 may generally comprise a cube or a rectangular cuboid shape having rounded edges and a single cutter inlet 204 into which a pizza cutter 300 may be placed. The cutter inlet 204 may comprise an opening in a cartridge lid 202 sufficient to allow a pizza cutter 300 circular blade to pass through. The cartridge lid 202 may be reversibly attached to a cartridge body 210, and the pizza cutter 300 circular blade may be suspended within a central cavity of the cartridge body 210 when the pizza cutter 300 is placed within the cutter inlet 204.

The illustrations of FIGS. 9-14 illustrate wiper blade mechanism of a pizza cutter cleaning, storage, and isolation device, as contemplated by the present disclosure. The cartridge lid 202 may further comprise a plurality of wiper switches 206 attached to a plurality of wiper blades 212. In one embodiment one each of a plurality of wiper blades 212 may be attached at a second end to a hinge located at a second end of the cutter inlet 204, and may be attached at a first end to one each of the plurality of wiper switches 206. The plurality of wiper switches 206 may articulate through a range of motion relatively towards and away from one another, and the motion may result on the movement of the plurality of wiper blades 212 towards and away from one another.

The plurality of wiper switches 206 may further comprise a locking or latching mechanism such that when they are moved towards one another the plurality of wiper switches 206 and, thus, the plurality of wiper blades 212, are locked in place against one another. In such an embodiment the cartridge lid 202 may further comprise a wiper release 208, which may disengage the locking or latching mechanism and allow the plurality of wiper switches 206 and, thus, the plurality of wiper blades 212, to move away from one other. In one embodiment the wiper blade mechanism may comprise a spring-loaded or otherwise tensioned mechanism to keep the plurality of wiper blades 212 in an open position until they are articulated by a user of the device.

By this design the pizza cutter cleaning, storage, and isolation device may provide an efficient solution for cleaning and storing a plurality of pizza cutters 300. The plurality of pizza cutters 300 may be distinguished from one another such as, for example, by the use of color coded handles, color coded cartridge lids 202, or engravings on the handles or cartridge lids 202. This distinguishing of the plurality of pizza cutters 300 allows a user to select a particular pizza cutter 300 for a particular type of pizza, such as a meat pizza, and select a different pizza cutter 300 for a different type of pizza, such as a vegetarian pizza.

To begin using the pizza cutter cleaning, storage, and isolation device a user may first reversibly attach a cartridge lid 202 to a cartridge body 210 and then install this combination into a cartridge slot 102 of the main body 100. The user may repeat this step as desired or as permitted by the number of cartridge slots 102 of a particular embodiment. The user may then activate the wiper release 208 so that the plurality of wiper blades 212 of a particular storage cartridge 200 are opened. The user may then place a pizza cutter 300 within the cutter inlet 204 of the storage cartridge 200 and then activate the plurality of wiper switches 206 of the storage cartridge 200 so that the plurality of wiper blades 212 are positioned against the pizza cutter 300 circular blade.

When ready to use a pizza cutter 300, the user may simply withdraw it from the storage cartridge 200, and the plurality of wiper blades 212 placed against the pizza cutter 300 circular blade may wipe off the circular blade as the pizza cutter 300 is withdrawn. The user may then use the pizza cutter 300 as desired, and then replace the pizza cutter 300 back into the storage cartridge 200 by again activating the wiper release 208, placing the pizza cutter 300 into the cutter inlet 204, and again activating the plurality of wiper switches 206.

By this design and method any debris on a used pizza cutter 300 circular blade may be pulled off of the circular blade by the plurality of wiper blades 212, and this debris may then fall to the bottom of the cartridge body 210. To clean the device the user may remove one or more of the storage cartridges 200 from the plurality of cartridge slots 102 in the main body 100 and separate the cartridge lid 202 from the cartridge body 210. The cartridge lid 202 and cartridge body 210 may then be emptied out and cleaned as desired.

In one embodiment the cartridge body 210 may receive an appropriate fluid cleaning bath, such as water, a soap and water combination, or an alcohol cleaning solution, so that that pizza cutter 300 circular blade is suspended in this fluid cleaning bath while a pizza cutter 300 is placed within a storage cartridge 200.

The pizza cutter cleaning, storage, and isolation device may be substantially constructed of any suitable material or combination of materials, but typically is constructed of a resilient material or combination of materials such that the device is resistant to damage as a result of compression, twisting, heating, or submersion in water. As an example, and without limiting the scope of the present invention, various exemplary embodiments of the pizza cutter cleaning, storage, and isolation device may be substantially constructed of one or more materials of silicone, plastic, acrylic, polycarbonate, steel, aluminum, brass, fiberglass, carbon fiber, or combinations thereof. In some embodiments the various components of the device may be coated, lined, or otherwise insulated to prevent contamination of the device.

In one embodiment the material of construction may vary from one component to the next within the system. By way of example, the main body 100 and storage cartridge 200 may comprise a rigid plastic or other rigid material. A plurality of appropriate waterproof seals, such as those made of a soft plastic or silicone, may line the edges of various openings and mating surfaces throughout the device. The plurality of wiper blades 212 may be made of a semi-rigid plastic or silicone so that they are flexible though resistant to tearing.

In one embodiment the pizza cutter cleaning, storage, and isolation device may comprise a resilient material of construction that either comprises a material having antimicrobial properties or comprises a layering of antimicrobial material or coating. Antimicrobial properties comprise the characteristic of being antibacterial, biocidal, microbicidal, anti-fungal, anti-viral, or other similar characteristics, and the oligodynamic effect, which is possessed by copper, brass, silver, gold, and several other metals and alloys, is one such characteristic. Copper and its alloys, in particular, have exceptional self-sanitizing effects. Silver also has this effect, and is less toxic to users than copper. Some materials, such as silver in its metallic form, may require the presence of moisture to activate the antimicrobial properties.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

I claim:

1. A pizza cutter cleaning, storage, and isolation device, comprising:
- a main body;
- a plurality of storage cartridges;
- a plurality of wiper blades;
- a plurality of wiper switches; and
- a plurality of wiper releases;
- wherein said main body further comprises a plurality of cartridge slots;
- wherein said plurality of storage cartridges further comprise a plurality of cartridge lids and a plurality of cartridge bodies;
- wherein one each of said plurality of cartridge lids further comprises a cutter inlet;
- wherein one each of said plurality of cartridge bodies further comprises a central cavity;
- wherein one each of said plurality of cartridge lids is reversibly attached to one each of said plurality of cartridge bodies;
- wherein one each of said plurality of storage cartridges is reversibly installed within one each of said plurality of cartridge slots of said main body;
- wherein said plurality of wiper blades are attached to a bottom side of one each of said plurality of cartridge lids such that they create a slit opening below said cutter inlet;
- wherein said plurality of wiper blades comprise a first end and a second end;
- wherein one each of said plurality of wiper switches is attached to said first end of one each of said plurality of wiper blades;
- wherein said second end of said plurality of wiper blades are attached to a hinge point on said bottom side of one each of said plurality of cartridge lids;
- wherein said plurality of wiper switches reversibly articulate through a range of motion relatively toward and away from one another;
- wherein said plurality of wiper blades reversibly articulate from an open position to a closed position when said plurality of wiper switches are articulated through a range of motion relatively toward and away from one another;
- wherein said plurality of wiper switches reversibly lock into place when articulated toward one another; and
- wherein said plurality of wiper releases cause said plurality of wiper switches to articulate away from one another when activated.

2. The device of claim 1, further comprising:
a blade sharpener.

3. The device of claim 2, further comprising:
a plurality of pizza cutters.

4. The device of claim 2, further comprising:
a waterproof material of construction.

5. The device of claim 2, further comprising:
an antimicrobial layer.

6. The device of claim 2, further comprising:
an antimicrobial material of construction.

* * * * *